United States Patent [19]
Gorndt et al.

[11] 3,862,812
[45] Jan. 28, 1975

[54] ROTOR BLADE RETENTION SYSTEM

[75] Inventors: John H. Gorndt; Warren E. Schmidt; Robert R. Peterson, all of Erie, Pa.

[73] Assignee: Lord Corporation, Erie, Pa.

[22] Filed: July 18, 1973

[21] Appl. No.: 380,304

[52] U.S. Cl. ............................................. 416/141
[51] Int. Cl. ........................................... B64c 27/38
[58] Field of Search ........... 416/134, 135, 138, 140, 416/141

[56] References Cited
UNITED STATES PATENTS

| | | | |
|---|---|---|---|
| 3,292,712 | 12/1966 | Schmidt | 416/141 |
| 3,556,673 | 1/1971 | Killian | 416/141 X |
| 3,764,230 | 10/1973 | Rybicki et al. | 416/141 X |
| 3,782,854 | 1/1974 | Rybicki | 416/141 X |

Primary Examiner—Everette A. Powell, Jr.

[57] ABSTRACT

A rotor blade retention system is provided wherein a pair of serially arranged elastomeric bearing means comprising a plurality of alternating and bonded layers of rigid and elastomeric material restrain movement of the blade against centrifugal forces imposed thereon while permitting and sharing movement of the blade about one or more axes including the pitch axis. The layers of each bearing are oriented to be loaded at least partially in compression normal thereto in response to centrifugal forces on the blade and to be loaded torsionally and/or in shear along the layers in response to movement of the blade about other axes including the pitch axis. Preferably, structural connections of the bearings between the rotor hub and blade are made partially through the bearings for more efficient utilization of structural members and for reduced drag or aerodynamic resistance.

14 Claims, 6 Drawing Figures

PATENTED JAN 28 1975
3,862,812
SHEET 1 OF 3
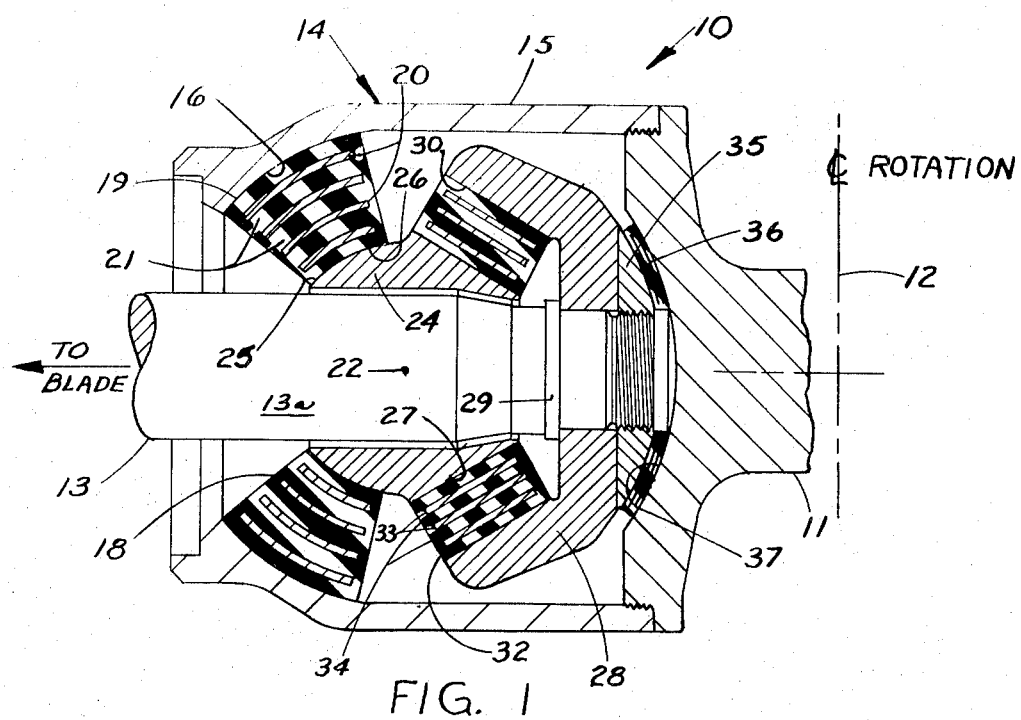
FIG. 1
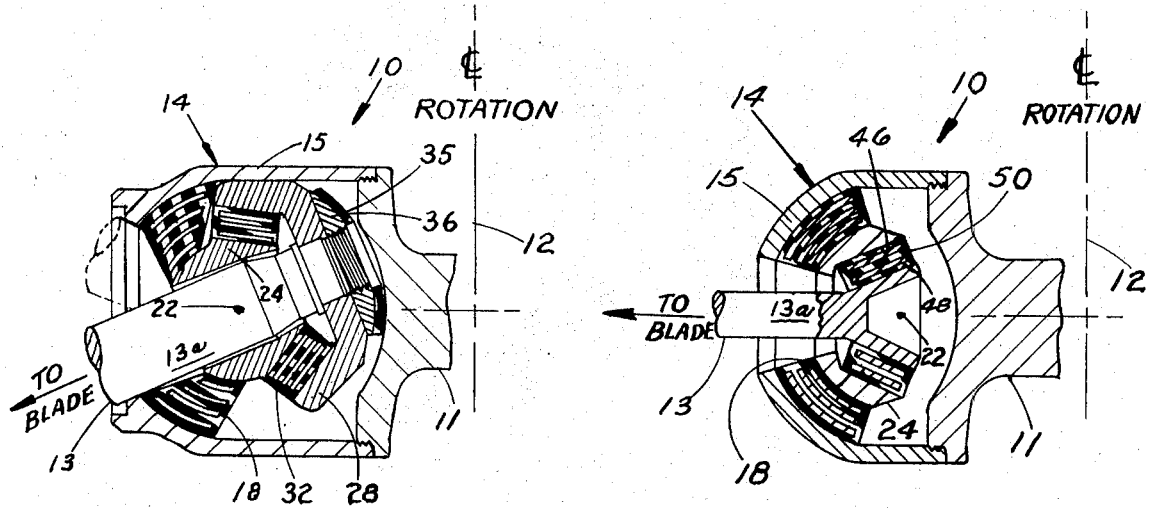
FIG. 2
FIG. 3

ROTOR BLADE RETENTION SYSTEM

This invention relates to rotor blade retention systems and more particularly to rotor blade retention systems suitable for use in aircraft such as helicopters or the like.

In conventional articulated rotor systems, it is customary to provide a blade retention system for each blade that includes separate connections for each axis of movement desired. For instance, in a fully articulated rotor system, three separate connections including precision roller bearings are provided for permitting pivotal movement of the blade about a lead-lag and a flapping axis and for rotation about a pitch axis. Simultaneously, each of these connections must restrain movement of the blade against centrifugal forces imposed thereon during rotation of the rotor system. Such combinations of loads and motions result in early failure of these connections.

In an effort to replace such complex structures and alleviate many of the inherent disadvantages associated therewith, attention has been directed to the use of elastomeric bearings comprising alternating and bonded layers of a rigid and elastomeric material such as described in Gorndt, et al; U.S. Pat. No. 3,106,965, issued Oct. 15, 1963 and assigned to the assignee of the present invention. These type bearings are characterized in their ability to withstand high compressive loads normal to the layers without excessive bulging of the elastomer with the elastomer being able to deflect in torsion and/or shear along the layers and accommodate motion. As illustrated in the above-referenced patent, such an elastomeric bearing of spherical design is assembled in the rotor system between the rotor hub and blade by interconnecting yokes whereby centrifugal forces imposed on the blade load the elastomeric bearing in compression normal to the layers for blade restraint while designed for articulated movement of the blade relative to the rotor hub is permitted by torsional and/or shear loading of the elastomeric bearing along the layers.

In the design of rotor blade retention systems utilizing elastomeric bearings of the subject type, there are numerous factors that are to be considered. In addition to the design of the bearings to restrain the blade against the centrifugal force imposed thereon during rotation of the rotor hub and to accommodate the various motions of the blade relative to the rotor hub, consideration must be given to but not limited to the fatigue life of the bearings under these load and motion conditions, the weight and size of the bearings and structural interconnections, the spring rate of the bearings in various modes, and the ability of the retention system to carry blade shear loads.

Subsequent to issuance of the above-referenced patent, improvements have been made in some of these latter areas as illustrated in the following patents: Gorndt, et al; U.S. Pat. No. 3,111,172, issued Nov. 19, 1963 and assigned to the assignee of the present invention; Kisovec, U.S. Pat. No. 3,282,350, issued Nov. 1, 1966; Schmidt, U.S. Pat. No. 3,292,712, issued Dec. 20, 1966 and assigned to the assignee of the present invention; Mosinskis, U.S. Pat. No. 3,501,250, issued Mar. 17, 1970; Killian, U.S. Pat. No. 3,556,673, issued Jan. 19, 1971; and Gorndt, U.S. Pat. No. 3,700,352, issued Oct. 24, 1972 and assigned to the assignee of the present invention.

Rather than discuss in detail each of these patents, it is sufficient to say that with the exception of Kisovec, U.S. Pat. No. 3,282,350, they are directed to rotor retention systems employing elastomeric bearings of the subject type wherein the blade shear load carrying ability is enhanced and/or wherein the centrifugal force imposed on the blade is shared between a pair of parallel arranged elastomeric bearings. Kisovec, U.S. Pat. No. 3,282,350 is directed to a retention system which allows folding of the blade and employs a single elastomeric bearing wherein part of the interconnection between the blade and rotor hub is through the elastomeric bearing. While this interconnection results in more efficient utilization of the structural elements, removal of the central portion of the bearing increases fatigue problems of the bearing in accommodating the various designed for motions over a prolonged period.

It is an object of the present invention to provide in a rotor blade retention system a pair of serially arranged elastomeric bearings comprising alternating and bonded layers of rigid and elastomeric material wherein movement of the blade at least about the pitch axis is shared so as to increase the respective fatigue life of the bearings while allowing for a reduction in the size and weight of the respective elastomeric bearings.

Another object of the present invention is to provide in such a rotor retention system at least partial structural interconnection of the bearings between the rotor hub and blade through one or both of the bearings to more efficiently utilize these structural elements and reduce drag.

A further object of the present invention is to provide, in such a rotor retention system, a pair of serially arranged elastomeric bearings that cooperate to allow for greater control of blade shear load carrying capabilities and spring rates of the retention system about various axes.

Another and still further object of the present invention is to provide a rotor retention system wherein a pair of serially arranged elastomeric bearings may be precompressed along the longitudinal axis of the blade to decrease the amount of deflection of the bearings during operation of the rotor system.

Briefly, the objects of the present invention are accomplished in a rotor blade retention system comprising a rotor hub rotatable about a central axis, at least one sustaining blade, and retention means connecting the blade to the rotor hub with the blade normally extending generally radially from the hub for rotation therewith about the central axis. The retention means includes a pair of elastomeric bearing means comprising a plurality of alternating and bonded layers of rigid and elastomeric material. The bearings are operatively connected or arranged in series between the blade and rotor hub with the layers of each bearing oriented to be loaded at least partially in compression normal to the layers and restrain the blade against centrifugal forces while being loaded torsionally and/or in shear along the layers to permit and share movement of the blade about various axes including the pitch axis or pivotal movement of the blade about its longitudinal axis. In a fully articulated rotor system, where movement of the blade must be accommodated about a lead-lag and flapping axis as well as the pitch axis, it is preferred that at least one of the serially arranged elastomeric bearings be spherical. The geometry of the other elastomeric bearing can be chosen in accordance with other criteria for the retention system including spring rates about various axes, the blade shear load carrying capabilities thereof and the amount and frequency of motion to be accommodated about the various axes.

Depending on the geometry of the respective elastomeric bearings, a centering bearing of conventional construction or otherwise may be interconnected for operation with the serially arranged elastomeric bearings for carrying blade shear loads. Further, it is preferred that interconnection of the serially arranged bearings between the rotor hub and blade to the extent feasible be made through the bearings. In one instance this is accomplished wherein each of the elastomeric bearings have a passage extending centrally therethrough with the inboard end of the blade extending through the passage and connected to the inboard end of the innermost bearing. A yoke or housing carried by the rotor hub receives the serially arranged bearings and is connected to the outboard end of the outermost bearing, the housing and inboard end of the blade cooperate with the bearings to restrain the blade against centrifugal forces while permitting and sharing movement about other designated axes including the pitch axis. This structural interconnection eliminates the need for interconnecting yokes and, thus, provides a more efficient structural connection and reduces drag that would otherwise exist with interconnecting yokes. Also, such interconnection allows for precompression of the elastomeric bearings along the longitudinal axis of the blade as will be more fully hereinafter described.

Some of the objects of the invention having been stated, other objects will appear as the description proceeds, when taken in connection with the accompanying drawings, in which:

FIG. 1 is a fragmentary side elevational view with parts in section of a rotor retention system of the present invention;

FIG. 2 is a reduced fragmentary view of the rotor retention system of FIG. 1 wherein pivotal movement of the blade about the flapping axis is illustrated; and FIGS. 3-6 are fragmentary side elevational views with parts in section of other respective embodiments of a rotor retention system of the present invention;

Figure 4:
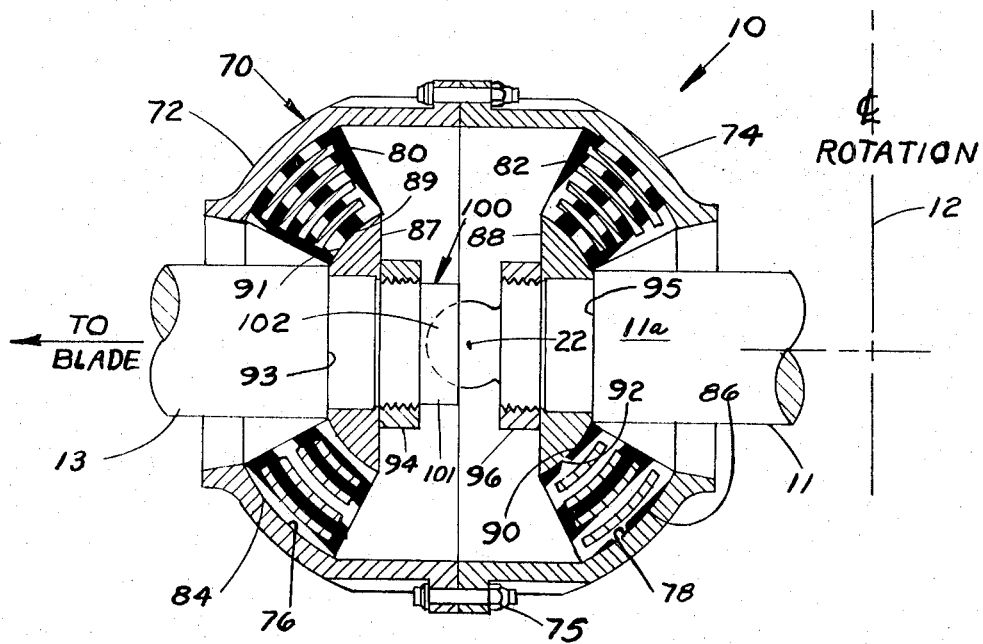

Referring more specifically to the drawings wherein like reference characters are employed to indicate like parts, there is shown in FIGS. 1-6 rotor retention systems of the present invention. While each of the rotor retention systems, to be hereinafter described, are for fully articulated systems, the concepts of the present invention apply to less than fully articulated system and to systems having any number of blades. The term "fully articulated systems" includes those rotor systems wherein means connecting the blade to the rotor hub must restrain movement of the blade against centrifugal forces imposed thereon while providing for pivotal movement of the blade relative to the rotor hub about a lead-lag or drag axis and a flapping axis and for rotation about a pitch or feathering axis.

The lead-lag axis is a vertical axis parallel to the central axis of the rotor hub and, thus, is for movement of the blade relative to the rotor hub in the plane of rotation of the blade. The flapping axis is a horizontal axis normal to the central axis of the rotor hub and is for pivotal movement of the blade relative to the rotor hub in a plane perpendicular to the plane of rotation of the rotor hub. These lead-lag and flapping motions are typically associated with aerodynamic effects on the blade, the weight of the blade and changes in speeds of rotation of the blade. The pitch axis is coincident with the longitudinal axis of the blade and, thus, is for rotation of the blade about its own longitudinal axis. Pitch motions are movements involved in maneuvering the aircraft.

With reference now to FIGS. 1 and 2 there is shown a rotor blade retention system, generally indicated at 10. As illustrated, the rotor blade retention system 10 comprises a rotor hub 11 which is rotatably driven by drive means, not shown, about a central axis 12. A sustaining blade 13 is connected to the rotor hub 11 by retention means, generally indicated at 14, with the blade normally extending generally radially from the rotor hub 11 for rotation therewith about the central axis 12.

The retention means 14 includes a bearing housing or yoke 15 fixedly attached to and carried by the rotor hub 11. The housing 15 has an opening in the outboard end thereof facing radially outward from the rotor hub 11 for receiving therethrough the inboard end 13a of the blade 13. The housing 15, internally thereof, adjacent and circumscribing the opening therein, defines a generally spherical shaped concave surface 16 facing inward toward the rotor hub 11. A spherical elastomeric bearing 18 having a passage extending centrally therethrough is disposed in the housing 15 with the passage therethrough aligned with the opening in the housing 15. The convex surface 19 of the bearing 18 faces outward from the rotor hub 11 and is bonded to and mates with the housing concave surface 16. The elastomeric bearing 18 comprises a plurality of alternating and bonded layers of rigid and elastomeric material 20 and 21, respectively. Rigid layers 20 will typically be of metal but may be of any other material which is relatively rigid as compared to the elastomer used. Elastomer layers 21 will typically be of natural or synthetic rubber. In bearing 18, the rigid layers 20 are spherical shaped with coincident centers at point 22 inwardly of the bearing 18 and coinciding with the longitudinal axis of the blade 13.

An elongate annular member 24 is disposed within the housing 15 with the opening therethrough aligned with the opening and passage through the housing 15 and bearing 18. The outboard end of the member 24 defines an outwardly facing spherical convex surface 25 that mates with and is bonded to the inwardly facing spherical concave surface 26 of bearing 18. The inboard end of member 24 defines a frusto-conical surface 27 on the outside thereof converging toward the rotor hub 11.

The inboard end 13a of the blade 13 extends through the opening in the housing 15, the passage of the bearing 18 and the annular member 24. A cup shaped member 28 is mounted over the inboard end 13a of the blade 13 and abuts against a shoulder 29 thereon. The cup shaped member 28 defines a frusto-conical surface 30 facing outwardly from the rotor hub 11 of the same inclination as surface 27 of the annular member 24 and is in spaced and opposed relation thereto.

A frusto-conical elastomeric bearing 32 comprising a plurality of alternating and bonded layers of rigid and elastomeric material 33 and 34, respectively, is disposed and bonded between the frusto-conical surfaces 27 and 30 concentric to the longitudinal axis of the blade 13. The layers of the bearing 32 are also frusto-conical and are inclined parallel to surfaces 27 and 30.

The effective elastic center of bearing 32 preferably coincides with point 22.

The cup shaped member 28 is secured on the inboard end 13a of the blade 13 by a spherical headed nut 35. Preferably an elastomeric pad 36 which may include a spherical rigid shim or plate is carried by the spherical headed nut 35 and abuts a mating spherical surface 37 defined by the rotor hub 11 and facing radially outward therefrom which during non-operation of the rotor hub 11 precompresses the elastomeric bearings 18 and 32 along the longitudinal axis of the blade 13. Also, the frictional engagement between the elastomeric pad 36 and surface 37 resists drooping of the blade 13 in the non-operating condition of the rotor hub 11. Additional means, not shown, may be employed to limit blade droop.

It will be apparent from the foregoing description that the elastomeric bearings 18 and 32 are interconnected in series between the outboard end of the housing 15 and the inboard end 13a of the blade 13. Also, the layers of each bearing 18 and 32 are oriented to be loaded at least partially in compression normal thereto and restrain the blade 13 against centrifugal forces imposed thereon in response to rotation of the rotor hub 11. More particularly, centrifugal loads on the blade 13 will be transmitted from the inboard end 13a of blade 13 through cup shaped member 28 to and through frusto-conical bearing 32 normal to the layers to the annular member 24, and from the annular member 24 through spherical bearing 18 normal to the layers to the housing 15 which in turn transmits same to the rotor hub 11. During rotation of the rotor hub 11, the centrifugal load on the blade 13 will be carried by each of the bearings 18 and 32 and, thus, further compress each of the serially arranged bearings 18 and 32 to free the engagement of the pad 36 with surface 37 of the rotor hub 11. Thus, this precompression feature will not be a hindrance to the bearings 18 and 32 permitting motions about various axes.

During rotation of the rotor hub 11, pitch motion or motions of the blade 13 about its longitudinal axis will be shared by elastomeric bearings 18 and 32 in proportion to their spring rates about this axis. It will be noted that such motion loads the bearings torsionally or in shear along the layers, the softest axis of the bearings. Thus, pitch motion of the blade is readily permitted. By sharing pitch motion of the blade, various advantages are obtained. Each bearing undergoes less strain about the pitch axis which allows for a reduction in the size, particularly diameter and weight of the bearing, a reduction in the spring rate about the pitch axis and, most importantly, provides for a greater fatigue life under cyclical pitch motions. This sharing of pitch motions also allows for the use of elastomeric bearings of less stack height than when a single bearing is employed. As a result, greater stability is provided to the bearings in that they are more resistant to buckling under the various loads and motions that are imposed thereon.

Lead-lag motion of the blade 13 relative to the rotor hub 11 will be readily permitted by the spherical bearing 18. Also, as shown in FIG. 2, flapping motion of the blade relative to the rotor hub 11 will be readily permitted by the spherical bearing 18. The frusto-conical bearing 32 is relatively stiff as compared to the spherical bearing 18 to motions about these latter axes. Such motions load the spherical bearing 18 in shear along the layers thereof. This different geometry of the bearings 18 and 32, thus, allows for control to some extent of the spring rates about the various axes. Also, the sharing of motion can to a large extent be limited to the more critical axis, normally the pitch axis.

Preferably, as shown, the bearings 18 and 32 are focalized to a coincident point 22 along the longitudinal axis of the blade 13. This focalization insures that blade shear loads act through the effective elastic center of each of the bearings 18 and 32 to prevent angular misalignment between the blade 13 and the annular member 24 and provides needed stability and resistance to blade shear loads.

The passage of the inboard end 13a of the blade 13 through the bearings 18 and 32 prior to connection therewith eliminates the need for a pair of interconnection yokes. By sharing pitch motion between the bearings 18 and 32, the loss of the central portion of bearing 18 is not as critical as compared to the teachings in Kisovec, U.S. Pat. No. 3,282,350.

In the embodiment illustrated in FIG. 3, the orientation of the frusto-conical elastomeric bearing and its interconnection between the inboard end 13a of blade 13 and member 24 have been altered. In this embodiment the inboard end of member 24 on the inside thereof defines a frusto-conical surface 46 diverging toward the rotor hub 11. The inboard end 13a of the blade 13 defines a radially outward facing frusto-conical surface 48 that diverges toward the rotor hub 11 at the same angle as that of the surface 46 and is in spaced and opposed relation thereto. A frusto-conical elastomeric bearing 50 of similar design and construction to that of bearing 32 except that bearing 50 diverges toward the rotor hub 11 is disposed and bonded between the frusto-conical surfaces 46 and 48. Operation of the rotor retention system of FIG. 3 is identical to that of FIG. 1.

In FIG. 4 there is shown another embodiment of the present invention. In this embodiment a pair of identical spherical elastomeric bearings are employed in series. The retention means, generally indicated at 70, comprises two housing sections 72 and 74 of mirror image design secured together by conventional means such as bolt and nut assemblies 75 to define a housing. Openings are included in opposite ends of the housing for receiving the inboard end 13a of the blade 13 and a shaft 11a forming a radial extension of the rotor hub 11, respectively.

The housing, internally thereof, adjacent and circumscribing the openings therein, defines generally spherical shaped concave surfaces 76 and 78 facing each other. Spherical shaped elastomeric bearings 80 and 82 having a passage extending centrally therethrough are disposed in the housing with their centers focalized toward each other to point 22 along the longitudinal axis of the blade 13 and the passages therethrough aligned with the openings in the housing. Remote outer convex surfaces 84 and 86 of the bearings 80 and 82, respectively, are bonded to and mate with the concave housing surfaces 76 and 78, respectively. Separate and axially spaced annular members 87 and 88 are disposed within the housing with the openings therethrough aligned with the housing openings. The proximate concave surfaces 89 and 90 of the bearings 80 and 82 are bonded to mating convex surfaces 91 and 92 of the annular members 87 and 88, respectively. The inboard end 13a of the blade 13 extends through the opening in housing section 72, the bearing 80 and annular member 87 and is removably secured to the annular member 87 against relative axial movement between a shoulder 93 adjacent the inboard end of blade 13 and a nut 94 threadably received thereon. The shaft 11a of rotor hub 11 similarly extends through the opening in housing section 74, the bearing 82 and annular member 88 and is removably secured to the annular member 83 against relative axial movement between a shoulder 95 adjacent the end of shaft 11a and a nut 96 threadably received thereon.

If precompression of the spherical elastomeric bearings 80 and 82 is desired, precompression means such as the means 100 may be employed. Means 100 comprises a spherical socket element 101 carried by the terminal end of the inboard end 13a of blade 13 and a spherical ball 102 of center at point 22 carried by the terminal end of the shaft 11a that mate and preload each bearing 80 and 82. During operation of the rotor hub 11, centrifugal loads on the blade 13 will further compress the bearings 80 and 82 and release contact between the elements 101 and 102 of the precompression means 100.

The bearings 80 and 82 are connected in series. Centrifugal loads on the blade 13 will be transmitted from the inboard end 13a of the blade 13 through bearing 80 normal to the layers to the housing, from the housing through bearing 82 normal to the layers to the shaft 11a of rotor hub 11. Pitch, lead-lag and flapping motions will be equally shared in torsion and/or shear along the layers of the elastomeric bearings 80 and 82.

Figure 5:
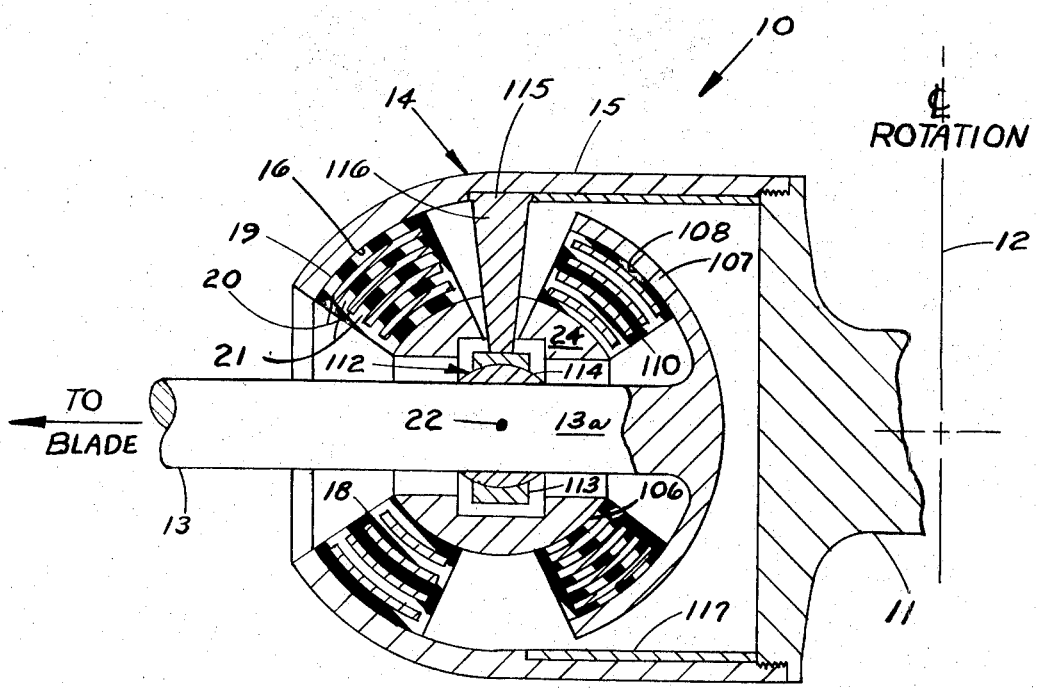

With reference to FIG. 5, there is shown an embodiment similar to that of FIG. 1. In this embodiment a pair of identical spherical elastomeric bearings are employed in series having focalized coincident centers that coincide with the longitudinal axis of the blade 13. A centering bearing is provided to provide increased resistance to blade shear loads and to insure deflection of the elastomeric bearings about their effective elastic centers. Only the portions different from that of FIG. 1 will be described. The inboard end of elongate annular member 24 defines on the outside thereof an inwardly facing convex spherical surface 106. The inboard end 13a of the blade 13 includes formed integrally therewith a cup shaped member 107 that defines a concave spherical surface 108 that faces outwardly from the rotor hub 11 and is in spaced and opposed relation to surface 106. Surfaces 106 and 108 preferably have coincident centers that coincide at point 22. A spherical elastomeric bearing 110 of identical design and construction to that of bearing 18 except for the reverse orientation is disposed and bonded between the surfaces 106 and 108.

A universal centering bearing, generally indicated at 112, having a fixed center at point 22 cooperates with the other structure to provide additional restraint for blade shear loads without interferring with operation of the remainder of the retention system. The universal bearing 112 includes a spherical socket 113 and a spherical ball 114 of center coincident with point 22 rotatably mounted in the socket 113. The socket 113 is mounted to the housing 15 concentric to the longitudinal axis of the blade 13 for transmitting blade shear loads directly to the housing 15 by a cylindrical spider 115 received within the housing 15 and having a plurality of radially inward projecting fingers 116 freely extending through the member 24 and secured to the socket 113. The spider 115 is held in axial position by a cylindrical sleeve 117 that cooperates with the rotor hub 11 to wedge the spider 115 axially between the housing 15 and sleeve 117. The inboard end 13a of the blade 13 passes through the ball 114 and is rotatable therewith and longitudinally movable relative to the ball 114. By having identical spherical elastomeric bearings 18 and 110 of coincident centers at point 22, pitch, lead-lag and flapping motions of the blade 13 relative to the rotor hub 11 will be equally shared. Centering bearing 112 prevents movement of the blade 13 transversely as a result of blade shear loads being transmitted directly to the housing 15 and, thus, insures that all these motions of the blade 13 will be generally about point 22. Since the universal bearing 112 is of the ball and socket type, it will not resist rotation or pivoting movement of the blade 13. Deflections of the bearings 18 and 110 due to centrifugal loads on the blade 13 will be accommodated in the centering bearing 112 by longitudinal sliding movement of the inboard end 13a of the blade 13 relative to ball 114.

Figure 6:
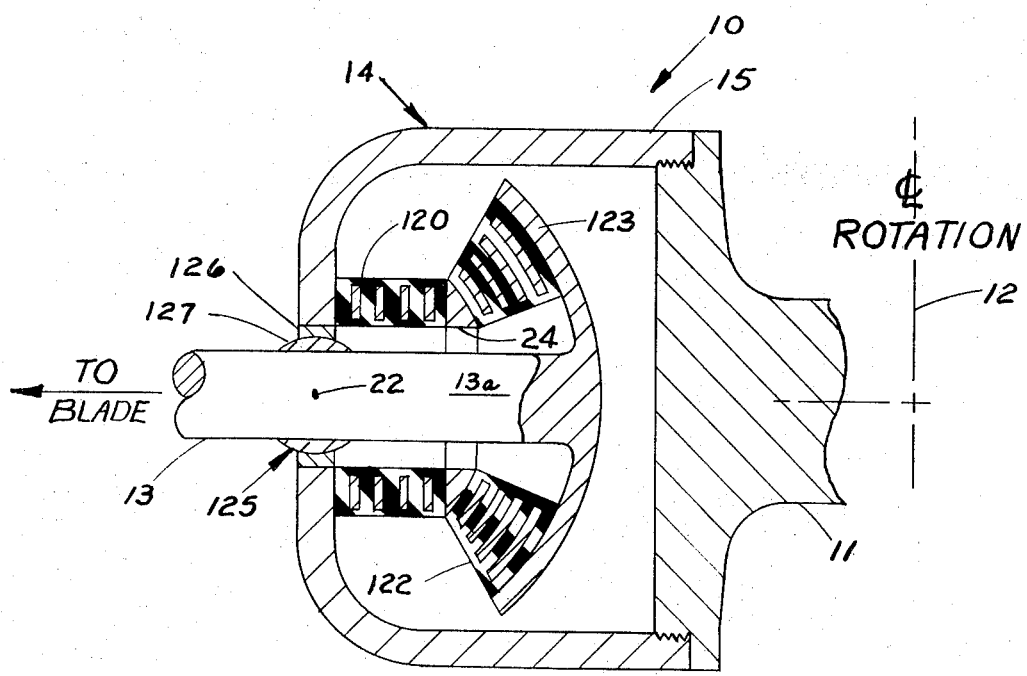

There is shown in FIG. 6 still another embodiment similar to that of FIG. 1. In this embodiment an axial and spherical elastomeric bearings 120 and 122, respectively, are arranged in series. For purposes of the present invention an axial elastomeric bearing is where the layers are spaced axially along and normal to the longitudinal axis of the blade 13.

As shown, the axial elastomeric bearing 120 is bonded between the outward end of the housing 15 and one end of the annular member 24 and the spherical elastomeric bearing 122 is bonded between the other end of member 24 and the cup shaped member 123 integral with inboard end 13a of blade 13. The layers of the spherical bearing 122 have coincident centers at point 22 along the longitudinal axis of the blade outboard from the bearing 122 and preferably, as shown, coincident with the opening in the outboard end of housing 15. Due to axial bearing 120, the retention system will have very little resistance to blade shear loads. For this purpose, a universal centering bearing 125 similar to that previously described for the embodiment of FIG. 5 is employed. The centering bearing 125 includes a spherical socket 126 carried by the housing 15 and positioned within the housing opening and a spherical ball 127 of center coincident with point 22 rotatably mounted in the socket 126. The inboard end 13a of the blade passes through the ball 127 and is rotatable therewith and longitudinally movable relative to the ball 127. Operation of the retention system of this embodiment will be apparent in view of descriptions of similar embodiments.

In the drawings and specification, there has been set forth a preferred embodiment of the invention and, although specific terms are employed, they are used in a generic and descriptive sense only and not for purposes of limitation.

What is claimed is:

1. A rotor blade retention system comprising
    a rotor hub rotatable about a central axis,
    at least one sustaining blade, and retention means connecting said blade to said rotor hub with said blade normally extending generally radially from said hub for rotation therewith about said central axis, said retention means including
        a pair of arcurate shaped elastomeric bearing means comprising a plurality of radially alternating and bonded layers of rigid and elastomeric material operatively connected in series along a longitudinal axis with said layers oriented to have a component normal to said axis, said serially arranged bearings mounted between said blade and rotor hub coincident with the longitudinal axis of said blade for restraining said blade against the centrifugal load imposed thereon by compression loading of each of said bearings at least partially normal to said layers while permitting and sharing pivotal movement of said blade about its longitudinal axis by loading said bearings torsionally along the layers, said radially alternating layers of each bearing being concentrically disposed about the longitudinal axis of said blade and defining therealong an effective elastic center, the elastic centers of said bearings being coincident.

2. A rotor blade retention system, according to claim 1, wherein one of said elastomeric bearings is spherical shaped to also permit lead-lag and flapping movement of said blade relative to said rotor hub.

3. A rotor blade retention system, according to claim 1, wherein both of said elastomeric bearings are spherical shaped to also permit and share lead-lag and flapping movement of said blade relative to said rotor hub.

4. A rotor blade retention system, according to claim 1, including means for precompressing each of said elastomeric bearings along the longitudinal axis of said blade during non-rotation of said rotor hub.

5. A rotor blade retention system, according to claim 4, wherein said blade and rotor hub axially engage to precompress each of said elastomeric bearings along the longitudinal axis of said blade during non-rotation of said rotor hub and disengage during rotation of said rotor hub as a result of the axially compression of said bearings due to the centrifugal load imposed on said blade.

6. A rotor blade retention system comprising
a rotor hub rotatable about a central axis,
at least one sustaining blade and retention means connecting said blade to said rotor hub with said blade normally extending generally radially from said hub for rotation therewith about said central axis, said retention means including
a pair of arcurate shaped elastomeric bearing means comprising a plurality of radially alternating and bonded layers of rigid and elastomeric material operatively connected in series along a longitudinal axis with said layers oriented to have a component normal to said axis,
each of said bearings having a passage extending centrally therethrough coincident with said longitudinal axis,
one of said blade and rotor hub being received through the passages of said bearings,
said serially arranged bearings mounted between said blade and rotor hub coincident with the longitudinal axis of said blade for restraining said blade against the centrifugal load imposed thereon by compression loading of each of said bearings at least partially normal to said layers while permitting and sharing pivotal movement of said blade about its longitudinal axis by loading said bearings torsionally along the layers,
said radially alternating layers of each bearing being concentrically disposed about the longitudinal axis of said blade and defining therealong an effective elastic center, the elastic center of said bearings being coincident.

7. A rotor blade retention system, according to claim 6, including a housing carried by said rotor hub, said housing having an opening therein facing radially outward from said rotor hub, said bearings being disposed within said housing, said blade having an inboard end received through the opening in said housing and passage of both of said bearings, and said serially arranged bearings being mounted between the inboard end of said blade and the outboard end of said housing adjacent said opening therein.

8. A rotor blade retention system comprising
a rotor hub rotatable about a central axis,
at least one sustaining blade, and retention means connecting said blade to said rotor hub with said blade normally extending generally radially from said hub for rotation therewith about said central axis, said retention means including
a bearing housing carried by one of said rotor hub and the inboard end of said blade, said housing having an opening in the end thereof facing the other of said blade and rotor hub,
a pair of arcurate shaped elastomeric bearing means comprising a plurality of radially alternating and bonded layers of rigid and elastomeric material disposed within said housing, each of said bearings having a passage extending centrally therethrough aligned with each other and the opening in said housing,
the other of said rotor hub and the inboard end of said blade extending through said opening in said housing and the passages of each of said bearings, said bearings being mounted in series with each other between said housing and the inboard end of said blade with said layers of each bearing oriented to be loaded at least partially in compression normal thereto and restrain said blade against centrifugal forces imposed in response to rotation of said hub while being loaded torsionally to permit and share pivotal movement of said blade about its longitudinal axis,
said radially alternating layers of each bearing being concentrically disposed about the longitudinal axis of said blade and defining therealong an effective elastic center, the elastic center of said bearings being coincident.

9. A rotor blade retention system comprising a rotor hub rotatable about a central axis,
at least one sustaining blade, and retention means connecting said blade to said rotor hub with said blade normally extending radially from said hub for rotation therewith about said central axis, said retention means including
a bearing housing carried by said rotor hub, said housing having an opening therein facing radially outward from said rotor hub, and defining internally thereof adjacent and circumscribing said opening a surface facing radially inward toward said rotor hub,
a pair of arcurate shaped elastomeric bearing means comprising a plurality of radially alternating and bonded layers of rigid and elastomeric material disposed within said housing, each of said bearings having a passage extending centrally therethrough aligned with each other and the opening in said housing, the inboard end of said blade extending through said opening and the passage of each of said bearings and having means carried thereby extending transversely of said blade axis and defining a surface concentric to said blade axis facing radially outward from said rotor hub, said bearings being mounted in series with each other between said housing and blade surfaces with said layers oriented to have a component normal to the longitudinal axis of said blade to be loaded at least partially in compression normal to the layers and restrain said blade against centrifugal loads imposed in response to rotation of said hub while being loaded torsionally to permit and share pivotal movement of said blade about its longitudinal axis, said radially alternating layers of each bearing being concentrically disposed about the longitudinal axis of said blade and defining therealong an effective elastic center, the elastic center of said bearings being coincident.

10. A rotor blade retention system, according to claim 9, wherein at least one of said elastomeric bearings is spherical shaped and including a universal centering bearing carried by said housing and supporting said blade relative to said housing against blade shear loads, the centers of said elastomeric bearings and centering bearing substantially coinciding with each other and cooperating to permit pivotal movement of said blade about a lead-lag and flapping axis as well as the pitch axis.

11. A rotor blade retention system, according to claim 10, wherein said centering bearing has a fixed center.

12. A rotor blade retention system, according to claim 10, wherein said universal centering bearing comprises a spherical socket fixed to said housing and a ball rotatably mounted in said socket, the center of said ball coinciding with the centers of said elastomeric bearings, the inboard end of said blade being disposed centrally through said ball for rotation therewith and longitudinally movable relative to said ball.

13. A rotor blade retention system, according to claim 9, wherein one of said elastomeric bearings is spherical shaped and the other is frustoconical shaped.

14. A rotor blade retention system, according to claim 9, wherein both of said elastomeric bearings are spherical shaped.

* * * * *